United States Patent [19]

Bernardi, Jr. et al.

[11] Patent Number: 5,392,855
[45] Date of Patent: Feb. 28, 1995

[54] METHOD TO PREPARE POLYMER SOLUTIONS FOR DOWN-HOLE APPLICATIONS

[75] Inventors: Louis A. Bernardi, Jr.; Hon C. Lau, both of Houston, Tex.; David A. Cole, Metairie, La.

[73] Assignee: Shell Oil Company, Houston, Tex.

[21] Appl. No.: 245,144

[22] Filed: May 16, 1994

[51] Int. Cl.⁶ ............... E21B 43/22; E21B 43/26; E21B 43/27; E21B 43/04

[52] U.S. Cl. ................... 166/278; 166/282; 166/283

[58] Field of Search ............ 166/282, 283, 307, 278, 166/294; 175/65; 252/8.551, 8.553

[56] References Cited

U.S. PATENT DOCUMENTS

| | | | |
|---|---|---|---|
| 3,779,914 | 12/1973 | Nimerick | 252/8.551 |
| 3,893,510 | 7/1975 | Elphingstone et al. | 166/294 X |
| 4,103,742 | 8/1978 | Swanson | 166/282 X |
| 4,321,968 | 3/1982 | Clear | 166/275 |
| 4,369,843 | 1/1983 | Mondshine | 166/292 |
| 4,487,265 | 12/1984 | Watanabe | 166/307 |
| 4,502,969 | 3/1985 | Shell | 252/8.551 |
| 4,510,993 | 4/1985 | Luetzelschwab | 166/75.1 |
| 4,620,596 | 11/1986 | Mondshine | 166/292 |
| 4,621,692 | 11/1986 | Mondshine | 166/281 |
| 4,809,782 | 3/1989 | Shu | 166/275 |
| 5,007,481 | 4/1991 | Williams et al. | 166/300 |
| 5,027,899 | 7/1991 | Grubert | 166/278 |
| 5,058,677 | 10/1991 | Forrest | 166/278 |
| 5,184,679 | 2/1993 | Lau | 166/278 |
| 5,251,699 | 10/1993 | Lau et al. | 166/278 |

OTHER PUBLICATIONS

Advertisement: Komax Systems, Inc., 1947 East 223rd St., Long Beach, Calif. 90810–1689, 4 pages.

*Primary Examiner*—Stephen J. Novosad
*Attorney, Agent, or Firm*—Del S. Christensen

[57] ABSTRACT

A method is provided to produce a polymer-thickened solution for injection into a wellbore, the method comprising the steps of:

a) providing an aqueous polymer solution or suspension;

b) dispersing the aqueous polymer solution or suspension into an aqueous stream not containing any of the polymer through nozzles wherein the nozzles have an opening of no larger than a circle of about ⅛-inch diameter;

c) passing the aqueous stream containing the polymer solution or suspension through a static mixer having a residence time of at least about 0.5 seconds; and d) injecting the polymer-thickened solution into a wellbore. The polymer-thickened solution prepared according to the present invention may be used as a fracturing fluid, combined with gravel pack sand and used for gravel packing a wellbore, used as an acid treatment composition or used as a fluid loss composition.

17 Claims, No Drawings

METHOD TO PREPARE POLYMER SOLUTIONS FOR DOWN-HOLE APPLICATIONS

FIELD OF THE INVENTION

The present invention relates to a method to produce a polymer-thickened solution for wellbore applications.

BACKGROUND OF THE INVENTION

Polymer-thickened solutions are used for many purposes in the field of drilling and completing oil and gas wells. When wells are gravel-packed, polymers are usually incorporated in the gravel pack composition to improve the suspension of gravel pack solids. U.S. Pat. Nos. 5,027,899; 5,058,677; 5,184,679; and 5,251,699 describe exemplary gravel packing processes. Polymers can also be used as thickeners in conjunction with formation acid treatment. U.S. Pat. Nos. 3,779,914; 4,487,265; and 5,007,481 disclose exemplary acid treatment methods that utilize such polymers.

Well completion and workover fluids designed to have fluid loss control properties often contain polymer thickeners to reduce fluid loss by increasing the low-shear viscosity. U.S. Pat. Nos. 4,369,843; 4,502,969; 4,620,596; and 4,621,692 disclose compositions that are exemplary.

When these compositions are prepared at a wellhead location, they are typically prepared in large batches, with the polymers added to large tanks equipped with paddle stirrers and recirculation pumps. Providing such equipment can be relatively expensive, and mixing large volumes of viscous solutions can be very time-consuming. These problems are particularly evident when the polymer-thickened composition is to be used in an offshore operation because offshore platforms have limited space and limited allowed deck loads.

When polymer-thickened compositions are prepared at wellhead locations by batch mixing, it is not uncommon for the final composition to be of less than desirable consistency. If polymer concentrates are not hydrated fully, "fish eyes" of unhydrated polymers form. These fish eyes can significantly impair permeability into the wellbore. To provide adequate mixing between the polymers and the carrier fluids, the solutions are often circulated by pumps to provide some shearing and mixing. Pumps used for circulating the polymer-thickened solutions often shear and degrade the polymers, resulting in the polymer being less effective as a thickener.

It is therefore an object of the present invention to provide a method to produce a polymer-thickened fluid wherein the polymer-thickened fluid is produced continuously and is produced in a fully hydrated form. It is another object of the present invention to provide such a method wherein a homogenous thickened fluid is prepared. It is a further object to provide such a method wherein the mixing of the polymer into the polymer-thickened solution does not result in degradation of the polymer.

SUMMARY OF THE INVENTION

These and other objects are accomplished by a method to produce a polymer-thickened solution for injection into a wellbore, the method comprising the steps a) providing an aqueous polymer solution or suspension;

b) dispersing the aqueous polymer solution or suspension into an aqueous stream not containing any of the poller through nozzles wherein the nozzles have an opening of no larger than a circle of about ⅛-inch diameter;

c) passing the aqueous stream containing the polymer solution or suspension through a static mixer having a residence time of at least about 0.5 seconds; and d) injecting the polymer-thickened solution into a wellbore.

The polymer-thickened solution prepared according to the present invention may be used as a fracturing fluid, combined with gravel pack sand and used for gravel packing a wellbore, used as an acid treatment composition or used as a fluid loss pill.

Dispersing a polymer solution or suspension through small holes into a flowing aqueous stream and then passing the combined stream through a static mixer results in a homogenous thickened composition. The polymer rapidly hydrates due to the intimate contact with the aqueous stream. The homogenous stream may be immediately used for the intended purpose at the wellhead, or may be stored in a tank for future use. Mixing of the polymer-thickened solution in a storage tank would only be necessary if the polymer-thickened solution contained suspended solids that could settle over time.

DETAILED DESCRIPTION OF THE INVENTION

The polymer-thickened solution of the present invention may be used for any of the purposes that polymer-thickened solutions are used in the oil and gas production art. Examples include fluid loss pills, gravel pack processes, acid treatment compositions, and fracturing fluids. The polymer may be any of the water soluble polymers know to be useful for such purposes, that are available, or that can be prepared as a concentrated liquid form. Examples include polysaccharides and derivatives of polysaccharides such as cellulose derivatives, such as carboxyethylcellulose, carboxymethylcellulose, carboxymethylhydroxyethylcellulose, alkylhydroxyalkylcelluloses, alkylcelluloses, alkylcarboxyalkylcelluloses and hydroxyalkylcelluloses (particularly hydroxyethylcellulose); and microbial polysaccharides such as Succinoglycan polysaccharides, starch, starch derivatives, Scleroglucan polysaccharides and Xanthan polysaccharides and water soluble gaurs, gums and resins. Liquid hydroxyethylcellulose such as Tetravis LHB available from Tetra Technologies, Inc., liquid succinoglycans such as SHELL FLO-S, available from Shell International Chemical Company Limited, Ref. CSAS/12/21, Shell Centre, London SE1 7PG, England, or SHELL FLO-XA, a xanthan gum also available from Shell Chemical Company Limited.

The polymer concentrates can be purchased as liquids, or prepared using tanks and mixers that are considerably smaller than that which would be required to prepare the final compositions.

Distribution of the initial aqueous polymer suspension into a flowing stream must be done in a way that rapidly provides intimate contact between the polymer and the stream. This intimate contact is then maintained by passing the stream through a static mixer having a residence time of between about 0.5 and about 5 seconds. The residence time within the static mixer is sufficient to result in hydration of the polymer. This results in a stable suspension of polymer and a homogenous solution that will not contain fish eyes or otherwise be formation damaging.

Applicant has found that adequate dispersion of the aqueous polymer suspension can be accomplished by forcing the aqueous polymer suspension through holes in a distributor having a diameter of about 1/32 to about ⅛ of an inch. Forcing the aqueous polymer suspension through the holes at velocities above about 1 foot per second is preferred to ensure that the polymer suspension does not agglomerate outside of the distributor. Greater velocities also improves contact between the polymers and the stream into which they are being mixed. The velocity at which the aqueous polymer suspension can be forced through the holes in the distributor is only limited by velocities that would shear the polymer, but these velocities would also result in excessive pressure differentials across the holes. Velocities that result in sufficient mixing but not shearing or excessive pressure differentials are between about 0.5 and about 200 feet per second.

The static mixer of the present invention maintains intimate contact between the polymer and the aqueous carrier fluid for a time period that is sufficiently long to result in a stable solution of the polymer. Typically, between about 0.5 and about 10 seconds residence time within the static mixer will be sufficient. The polymer is preferably fully hydrated, although the polymer could continue to hydrate for a time period after the fluid passes through the static mixer provided that the polymer remains in a stable solution.

Many static mixers are commercially available, and the particular static mixer selected for use in the method of the present invention is not critical. Static mixers are generally line-sized and provide mixing by a multiple of blades that divide and change the direction of parts of the stream being mixed. The divisions of the stream generally impact each other and form vortexes at the tips of the dividing blades. Mixing within static mixers is typically accomplished with less than 10 pounds per square inch pressure loss, and within about 10 diameters of pipe length.

Means of in-line mixing other than static mixers, such as globe valves, orifices and pumps, generally also shear the solutions, which is not desirable with the polymer-thickened solutions of the present invention. They also do not typically provide a residence time that would be sufficient for the practice of the present invention.

The polymer-thickened solution of the present invention could be used, for example, for acid treatment compositions, gravel pack fluids, fluid loss pills, or for fracturing fluids. Methods disclosed in U.S. Pat. Nos. 5,027,899; 5,058,677; 5,184,679; and 5,251,699, the disclosures of which are incorporated herein by reference, describe exemplary gravel packing processes. U.S. Pat. Nos. 3,779,914; 4,487,265; and 5,007,481, the disclosures of which are incorporated herein by reference, disclose an exemplary acid treatment methods. U.S. Pat. Nos. 4,369,843; 4,502,969; 4,620,596; and 4,621,692, the disclosures of which are incorporated herein by reference, disclose compositions and methods that are exemplary of well completion and fluid loss compositions and methods that include polymer-thickened compositions.

EXAMPLE

Preparation of acceptable polymer-thickened solution was prepared using a bench-scale mixer to demonstrate the present invention. A 12-inch long "KOMAX" static mixer having a 1-inch outside diameter was fitted with a 0.25-inch diameter injection stinger with five 1/16-inch holes drilled facing the up-stream direction. The stinger was place perpendicular to the direction of flow at the inlet of the static mixer. A solution containing sufficient sodium chloride to result in a density of about 10 pounds per gallon was combined with a solution of 60 pounds of active "SHELLFLO-S" polymer per 1000 gallons injected through the stinger. The resultant solution contained 4.2 pounds of active "SHELLFLO-S" polymer per thousand gallons of final solution. The final solution appeared homogeneous and had a viscosity higher than a solution containing the same concentrations of polymer and salt prepared by stirring for 1 hour.

A pilot scale test was performed using a 42-inch long "KOMAX" static mixer having a 4-inch outside diameter. A stinger was prepared having twenty 1/16-inch diameter holes along one side of the stinger. The stinger was positioned at the inlet of the static mixer perpendicular to the direction of flow with the holes placed facing up-stream. A "SHELLFLO-S" polymer solution having 60 pounds of active polymer per 1000 gallons was combined with a 11.1 pound per gallon calcium chloride solution using this apparatus at varying brine flow rates. It was found that at brine flow rates above about 1 bbl/min, the resultant polymer thickened solution was consistent and apparently fully hydrated. Tap water was then combined with the polymer using the same apparatus and it was found that consistent and fully hydrated polymer-thickened solutions were obtained at rates of 0.5 bbl/min of water.

A larger scale test was performed with a the same 4-inch diameter "KOMAX" static mixer combining "SHELLFLO-XA" polymer with a 10% by weight hydrochloric acid solution. The polymer was combined with the acid to form a thickened solution having about 36 pounds of active polymer per 1000 bbl of total solution. The rate at which acid solution was combined with the polymer was about 3. bbl/min, resulting in a residence time of about 1.6 seconds in the static mixer. The initial polymer-thickened composition was run through the static mixer a second time to test the effect of additional mixing. The compositions all were homogenous and stable. The additional pass through the static mixer resulted in slight increase of low-shear-rate viscosities, indicating that the polymer was not fully hydrated during the initial pass through the blender.

To compare the effectiveness of the method of the present invention to conventional methods, a polymer-thickened composition was prepared by circulating the composition through a centrifugal pump from a tank having a paddle mixer and back into the tank. The residence time in the tank was about 3 minutes. The composition contained 10% hydrochloric acid solution and "SHELLFLO-XA", polymer resulting in a composition having a final concentration of 36 pounds of active polymer per 1000 bbl of final solution. The low-shear-rate viscosities of the polymer solutions prepared by this blending were a strong function of the time the solution had been blended. After about one and one half residence times, the polymer solution had a low-shear-rate viscosity that was an order of magnitude lower than the low-shear-rate viscosities of the solution prepared according to the present invention. The low-shear-rate viscosities of the solution being blended in this comparative example reached a maximum at about seven and one half residence times, but the maximum was 25% less than the low-shear-rate viscosity achieved by the method of the present invention. Blending according to the prior art therefore resulted in less effective polymer in all cases, and if the blending is not very near the optimum, the polymer can be significantly less effective.

We claim:

1. A method to produce a polymer-thickened solution for injection into a wellbore, the method comprising the steps of:
    a) providing an aqueous polymer solution or suspension;
    b) disbursing the aqueous polymer solution or suspension into an aqueous stream not containing any of the polymer through nozzles wherein the nozzles have an opening of no larger than a circle of about ⅛-inch diameter;
    c) passing the aqueous stream containing the polymer solution or suspension through a static mixer having a residence time of at least about 0.5 seconds; and
    d) injecting the poller-thickened solution into a wellbore.

2. The method of claim 1 wherein the polymer is selected from the group of polysaccharides and derivatives of polysaccharides.

3. The method of claim 1 wherein the polymer is selected from the group consisting of hydroxyethylcellulose, cellulose, cellulose derivatives, starch, starch derivatives, and water soluble guars, gums and resins.

4. The method of claim 1 further comprising the step of combining the polymer-thickened solution with gravel packing solids prior to injection into the wellbore.

5. The method of claim 1 wherein the polymer-thickened solution, after injection into the wellbore, is effective to reduce fluid loss from the wellbore to a formation surrounding the wellbore.

6. The method of claim 1 wherein the polymer-thickened solution is injected into the wellbore as an acid treatment composition.

7. The method of claim 1 wherein the polymer solution or suspension is dispersed into the aqueous solution through nozzles at a velocity of greater than about 10 ft/sec.

8. The method of claim 6 wherein the polymer solution or suspension is dispersed into the aqueous solution through nozzles at a velocity of between about 20 and about 100 ft/sec.

9. The method of claim 1 wherein the polymer solution or suspension is dispersed into the aqueous solution through nozzles having openings of between about 1/32 and about ⅛ inches in diameter.

10. The method of claim 1 wherein the polymer in the aqueous solution, after passing through the static mixer is essentially fully hydrated.

11. The method of claim 2 further comprising the step of combining the polymer-thickened solution with gravel packing solids prior to injection into the wellbore.

12. The method of claim 10 wherein the polymer-thickened solution, after injection into the wellbore, is effective to reduce fluid loss from the wellbore to a formation surrounding the wellbore.

13. The method of claim 10 wherein the polymer-thickened solution is injected into the wellbore as an acid treatment composition.

14. The method of claim 10 wherein the polymer solution or suspension is dispersed into the aqueous solution through nozzles at a velocity of greater than about 10 ft/sec.

15. The method of claim 13 wherein the polymer solution or suspension is dispersed into the aqueous solution through nozzles at a velocity of between about 20 and about 100 ft/sec.

16. The method of claim 14 wherein the polymer solution or suspension is dispersed into the aqueous solution through nozzles having openings of between about 1/32 and about ⅛ inches in diameter.

17. The method of claim 15 wherein the polymer in the aqueous solution, after passing through the static mixer is essentially fully hydrated.

* * * * *